United States Patent Office 3,434,660
Patented Mar. 25, 1969

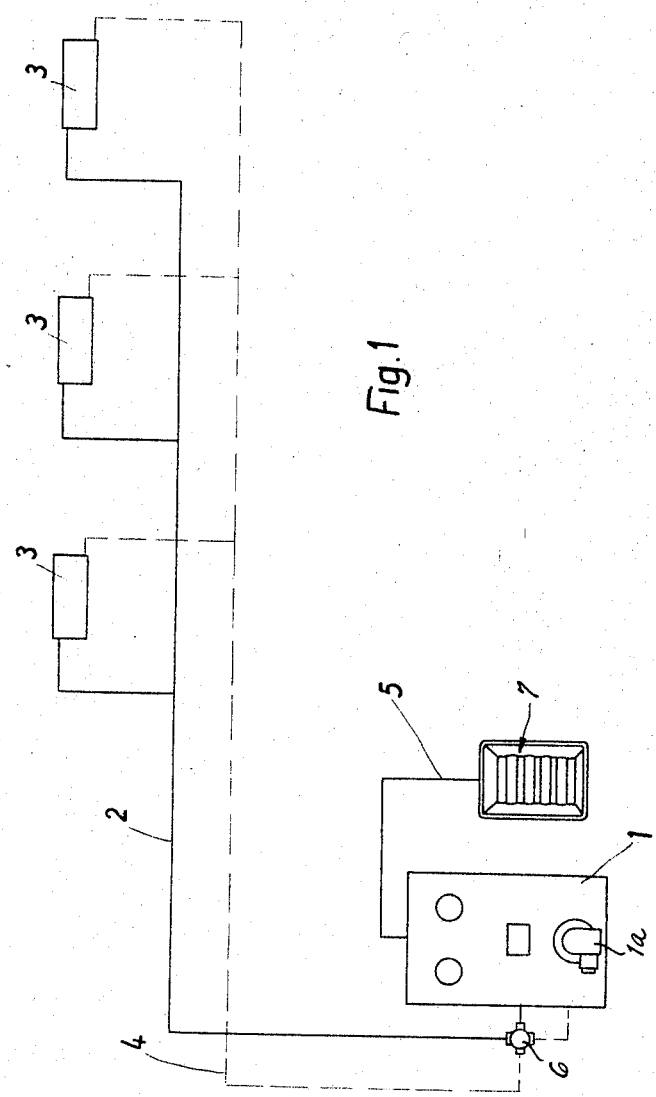

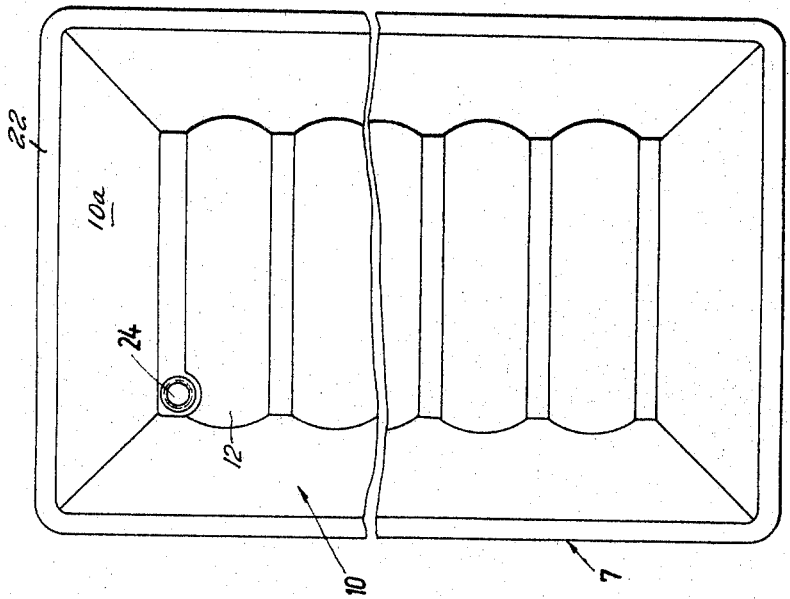
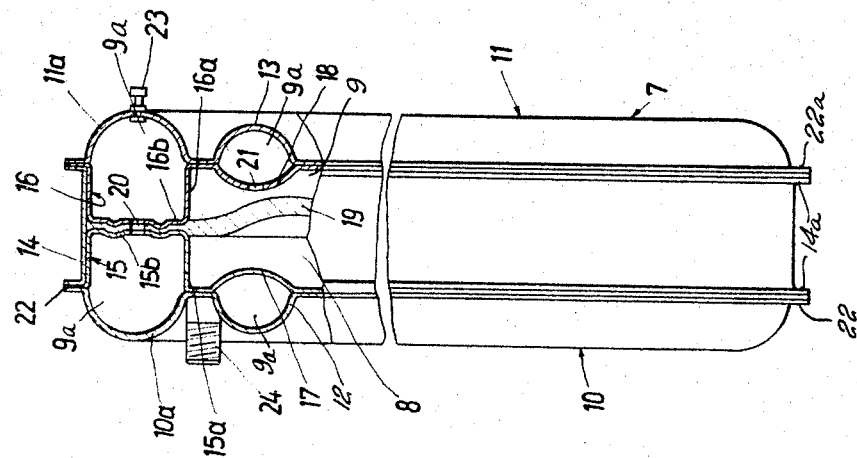

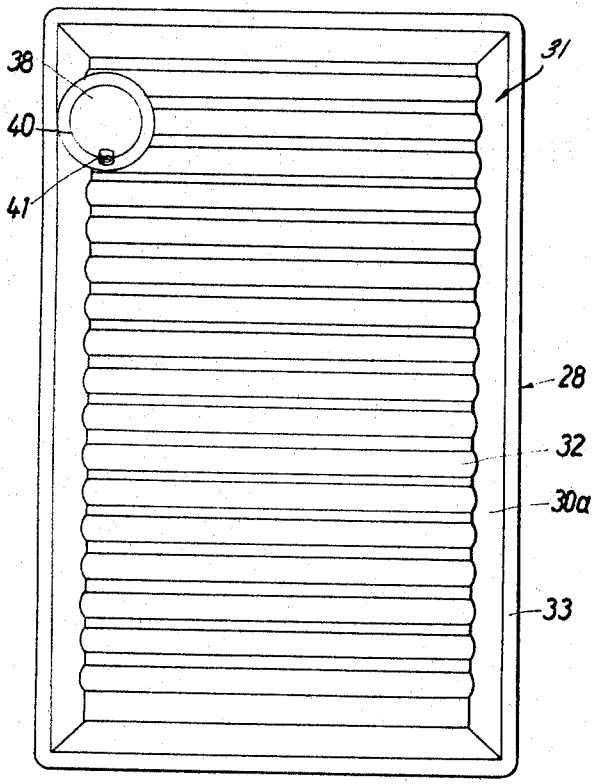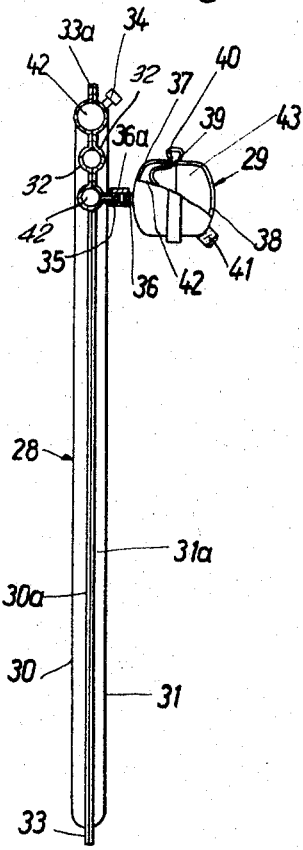

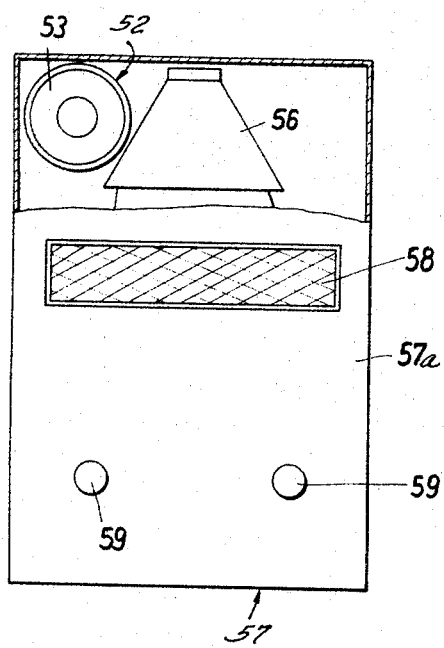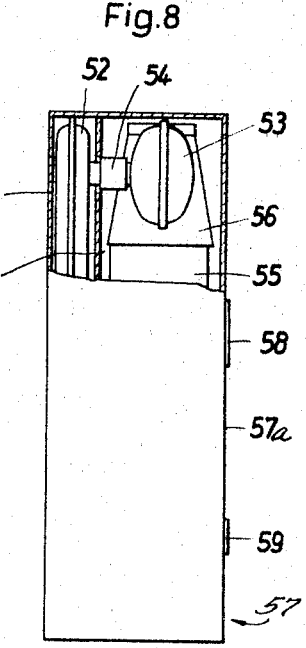

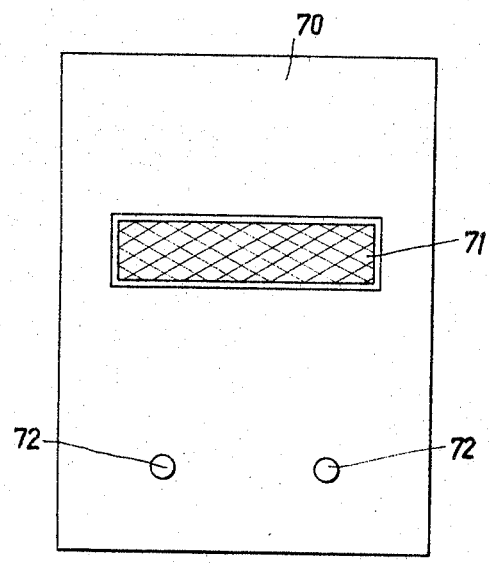
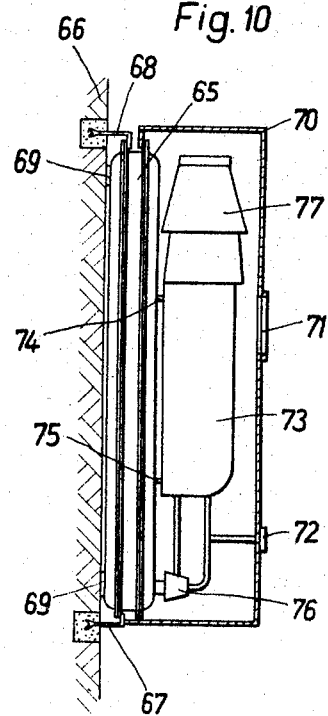

3,434,660
EXPANSION TANK FOR HOT-WATER HEATING SYSTEMS
Fritz Brumme, Raunheim, Hesse, and Horst Boehme, Ruesselsheim (Main), Germany, assignors to Effbe-Werke Fritz Brumme KG, Raunheim, Hesse, Germany
Filed May 19, 1966, Ser. No. 551,435
Claims priority, application Germany, Feb. 19, 1966, E 31,076
Int. Cl. F24d 3/10
U.S. Cl. 237—66   15 Claims

ABSTRACT OF THE DISCLOSURE

An expansion tank for a hot-water system and including chamber means divided by a flexible diaphragm in a first gas chamber and an expansion chamber communicating with the water-containing unit of the heating system, and a second gas chamber in communication with the first gas chamber and forming with the latter a plenum chamber, whereby the volume of the expansion chamber may increase at the expense of the first gas chamber in response, to expansion of the water of the heating system.

---

The present invention relates to heating systems in general, and more particularly to improvements in closed hot-water heating systems. Still more particularly, the invention relates to improvements in expansion tanks which are utilized in closed heating systems to accommodate surplus fluid in response to swell.

It is already known to provide a closed hot-water heating system with an expansion tank wherein a gas-filled chamber is separated from the expansion chamber by a flexible diaphragm which yields when the expansion chamber receives water in response to heating and resulting swell of water in the water-filled unit of the heating system. A serious drawback of such normally cylindrical expansion tanks is that they occupy too much room and cannot be properly concealed. In many instances, the boiler of the heating system resembles a block-shaped body or prism so that it cannot be combined with a cylindrical expansion tank to form therewith a compact unit of eye-pleasing appearance.

Accordingly, it is an important object of the present invention to provide an expansion tank for use in hot-water heating systems and to construct and assemble the tank with a view to insure that its component parts occupy a minimum of space, that such parts together form a body capable of being accommodated in areas which are readily available in a kitchen, boiler room or elsewhere, or that tank may be readily combined with one or more additional elements of the heating system.

Another object of the invention is to provide an expansion tank which may be arranged to support or to be supported by the boiler, gas heater or an analogous heating unit of a closed hot-water heating system.

A further object of the invention is to provide an eye-pleasing expansion tank which may be furnished in many sizes and/or shapes and which may be used in many types of heating systems.

Still another object of our invention is to provide an exceptionally flat expansion tank which can be readily installed existing heating systems and which can be assembled of relatively simple and inexpensive parts.

An additional object of the instant invention is to provide a heating system which embodies the improved expansion tank.

A concomitant object of the invention is to provide an expansion tank wherein one of the two chambers is fully concealed in the other chamber.

Another object of the present invention is to provide an expansion tank wherein the two chambers may share certain component parts so that the number of such parts is small and that the area occupied by the tank need not considerably exceed the maximum volume of the expansion chamber.

A further object of the invention is to provide an expansion tank which fully meets all requirements of health authorities, fire departments and other institutions which are in charge of supervising the construction, condition and/or operation of heating systems in public buildings as well as in apartment buildings, or private homes.

Briefly stated, one feature of our invention resides in the provision of a heating system, particularly a closed hot-water heating system, which comprises a fluid-filled unit (including, for example, one or more radiators or other types of heat exchangers, and feedwater and return lines), a heating unit for heating the fluid in the first named unit whereby such fluid swells, (i.e., its volume increases), and a novel expansion tank which comprises at least one relatively large and substantially flat plenum chamber, at least one expansion chamber in communication with the fluid-filled unit, and one or more diaphragms or analogous deformable wall means separating the plenum chamber from the expansion chamber and arranged to effect an increase in the volume of the expansion chamber at the expense of the plenum chamber. The maximum volume of the expansion chamber is smaller than the maximum volume of the plenum chamber and the maximum volume of the expansion chamber equals or at least approximates the volume of fluid which is expelled from the fluid-containing unit in response to maximum swell.

The diaphragm or diaphragms are preferably positioned and mounted in such a way that the volume of the expansion chamber is normally very small, particularly when compared with the volume of the plenum chamber. Thus, the overall size of the expansion tank is determined mainly by the size of the plenum chamber. Such construction greatly contributes to compactness of the expansion tank while insuring that the expansion chamber can accommodate all surplus fluid.

The novel features which are considered as characteristic of the invention are set forth in particular in the appended claims. The improved heating system itself, however, both as to its construction and its mode of operation, together with additional features and advantages thereof, will be best understood upon perusal of the following detailed description of certain specific embodiments with reference to the accompanying drawings, in which:

FIG. 1 is a schematic side elevational view of a closed hot-water heating system comprising an expansion tank which embodies one form of our invention;

FIG. 2 is an enlarged end elevational view of the expansion tank with the upper part partly broken away;

FIG. 3 is a view as seen from the left-hand side of FIG. 2;

FIG. 4 is a side elevational view of a modified expansion tank;

FIG. 5 is an end elevational view as seen from the left-hand side of FIG. 4, with a portion of the expansion tank broken away;

FIG. 7 is a front elevational view of a different casing which accommodates a gas heater and an expansion tank of the type shown in FIGS. 4 and 5, a portion of the casing being broken away;

FIG. 8 is a view as seen from the left-hand side of FIG. 7, with a portion of the casing broken away;

FIG. 9 is a front elevational view of a third casing which accommodates a gas heater and is mounted on an expansion tank of the type shown in FIGS. 2 and 3; and FIG. 10 is a view as seen from the left-hand side of FIG. 9, with a portion of the casing broken away.

Figure 6:
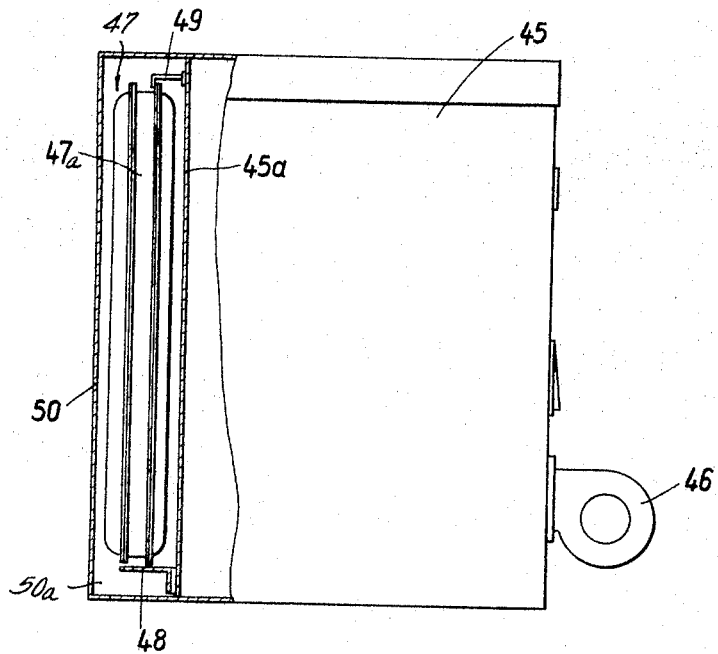
FIG. 6 is a side elevational view of a casing which accommodates a heating unit and an expansion tank of the type shown in FIGS. 2 and 3, a portion of the casing being broken away to illustrate the manner in which the expansion tank is mounted therein.

Referring first to FIG. 1, there is shown a closed hot-water heating system known as direct-return two-pipe system. It comprises a heating unit which includes a boiler 1 having a burner 1a, a feedwater line 2 which is connected with a series of heat exchangers 3, for example, a set of room radiators, and a return line 4 which supplies cooled water back to the boiler. A mixer valve 6 controls the flow of water in the lines 2 and 4. The heating system of FIG. 1 may be installed in a private home or in an apartment building.

In accordance with the present invention, the boiler 1 is connected with a conduit 5 which is further connected with the expansion chamber of a novel expansion tank 7 to be described in connection with FIGS. 2 and 3. The purpose of the expansion chamber in the tank 7 is to accommodate all such surplus water which is expelled from the water-containing unit of the heating system when the boiler 1 is in operation and heats the contents of the water-containing unit, i.e., when the water swells and its volume increases. The aforementioned water-containing unit is normally filled with water and includes the lines 2, 4, the radiators 3, the conduit 5, and such water-filled conduitary which is provided in the boiler 1.

The expansion tank 7 of FIGS. 2 and 3 resembles a flat body of rectangular outline and comprises three main components, namely, a plenum chamber which is filled with compressed gas (preferably nitrogen), an expansion chamber which is connected with the conduit 5 and whose volume may increase at the expanse of the plenum chamber, and a deformable wall in the form of a diaphragm 19 which separates the two chambers from each other. The diaphragm 19 allows for such increase in the volume of the expansion chamber at the expense of the plenum chamber that the expansion chamber can accommodate all surplus water which is expelled from the water-filled unit in response to maximum swell. In other words, the body of gas filling the plenum chamber can undergo such compression in response to entry of water into the expansion chamber via conduit 5 that the difference between the maximum and minimum volumes of compressed gas equals the maximum amount of water which enters the expansion chamber through the conduit 5.

The plenum chamber of the expansion tank 7 shown in FIGS. 2 and 3 comprises two flat rectangular housings which are closely adjacent to each other and each of which comprises two abutting profiled shells 10, 15 and 11, 16. The spaces which are filled with compressed gas are indicated by reference numerals 9 and 9a, and the space which can be filled with water is indicated by the numeral 8. It will be noted that the space 8 is located between the inner shell 15 and one side of the diaphragm 19, i.e., the shell 15 is a wall which forms part of both chambers. The space 9 at the other side of the diaphragm 19 forms a first gas chamber and the spaces 9a form a second gas chamber communicating with said first gas chamber and forming a plenum chamber therewith.

The marginanal portions 10a, 15a of the left-hand housing, as viewed in FIG. 2, together constitute a hollow annular rim whose interior is filled with gas. In addition, the shells 10, 15 are formed with a plurality of corrugations 12, 17 which together form a set of hollow ribs disposed within the confines of the aforementioned rim and having end portions in communication with the rim so that each rib is filled with compressed gas. It will be noted that the corrugations 12 are more pronounced than the corrugations 17.

The other housing is a mirror image of the just described housing and its shells 11, 16 also comprise marginal portions 11a, 16a which define a hollow gas-filled rim. The shells 11, 16 also define a set of hollow ribs formed by their respective corrugations 13, 18, and such ribs are filled with compressed gas. The marginal portions 10a, 11a of the two outer shells 10, 11 are of substantially semicircular cross section and the curvature of the outer corrugations 12, 13 is more pronounced than that of the matching inner corrugations 17, 18. The marginal portions 15a, 16a of the inner shells 15, 16 are of substantially rectangular cross sectional outline (i.e. each thereof resembles a letter U) and their median zones or portions 15b, 16b are corrugated or otherwise deformed to properly engage the marginal portion of the diaphragm 19. In other words, the marginal portion of the diaphragm 19 is sealingly clamped between the median zones 15b, 16b. The outermost zones of the marginal portions 10a, 15a and 11a, 16a are bent outwardly to respectively form pairs of abutting flanges 22, 22a. These pairs of flanges straddle the flanges 14a of an annular strap 14 which surrounds the adjoining portions of the two rims and whose flanges 14a are welded to the flanges 22, 22a by a seam of weldant so that the two flat rectangular housings of the plenum chamber form a sealed unit. The median zones 15b, 16b and the marginal portion of the diaphragm 19 are provided with one or more registering openings 20 which allow compressed gas to flow between the two housings. Aperatures 21 in the corrugations 18 of the inner shell 16 permit compressed gas to fill the space 9 at the right-hand side of the diaphragm 19, as viewed in FIG. 2. The spaces 9 may be filled through a gas valve 23 provided on the marginal portion 11a of the outer shell 11. A nipple 24 is provided on the left-hand housing of the plenum chamber and allows water to flow between the space 8 and the conduit 5 of FIG. 1.

When the boiler 1 is in operation and the contents of the water-filled unit 2–5 begin to swell, water flows from the boiler 1 through the conduit 5 and nipple 24 to enter the space 8 of the expansion tank. Such water flexes the diaphragm 19 in a direction to the right, as viewed in FIG. 2, so that the volume of the plenum chamber (spaces 9) decreases and the gas undergoes further compression. The openings 20 and apertures 21 allow for equalization of gas pressure in each of the spaces 9. As mentioned hereinabove, the difference between the minimum and maximum volumes of the space 8 is preferably just large enough to insure that the expansion chamber can accommodate all surplus water which is admitted by the conduit 5 in response to maximum swell. In other words, the dimensions of the expansion chamber are reduced to a permissible minimum and this chamber forms with the plenum chamber a compact package wherein the maximum volume of the plenum chamber exceeds the maximum volume of the expansion chamber.

A very important advantage of the structure shown in FIGS. 2 and 3 is that water filling the space 8 remains entrapped even if one or more of the shells 10, 11 and 16 develop leaks. Thus, water cannot contaminate the area which accommodates the expansion tank. The same holds true if the diaphragm 19 develops a leak and allows water to enter the spaces 9.

FIGS. 4 and 5 illustrates a modified expansion tank 28 wherein the expansion chamber and the first gas chamber are again separated from each other by a flexible diaphragm 39. The plenum chamber of the tank 28 comprises further a single flat rectangular housing having two mirror symmetrical shells 30, 31 whose abutting marginal portions 30a, 31a together form an annular gas filled rim. Transversely extending corrugations 32 of the shells 30, 31 form a series of ribs which are filled with gas and whose ends communicate with the rim. The gas-filled spaces are identified by numerals 42 and the space defined by the expansion chamber is denoted by the numeral 43. This expansion chamber comprises a cup-shaped shell 38 whose marginal portion 40 is sealingly connected with the marginal portion of a similar shell 37 forming part of the plenum chamber. The nipples 35, 36 of the shells 31, 37 are coupled to each other by a piece of hose 36a so that the interior of the shell 37 can communicate with the interior of the housing formed by the shells 30, 31. The nipple 41 of the shell 38 is connected with a conduit corresponding to the conduit 5 of FIG. 1 so that the space 43 can receive surplus water which flexes the diaphram 39 in a sense to increase the volume of the space 43 at the expense of the plenum chamber. The shells 37, 38 together form a capsule-like housing 29 which is just large enough to accommodate surplus water in response to maximum swell.

The shells 30, 31 of the rectangular housing have outwardly extending annular flanges 33 which are bonded to each other by a seam of weldant 33a. The marginal portions 40 of the shells 37, 38 may be bonded to each other in similar fashion. The shell 31 carries a gas valve 34 through which the spaces 42 may be filled with nitrogen or another suitable gaseous medium.

It is clear that the hose 36a may be replaced by a longer hose or by a rigid pipe, depending of the dimensions of the space which is allotted for the expansion tank 28. For example, the relatively short hose 36a will be replaced by a longer hose if the housing 29 is to be installed at a greater distance from the shells 30, 31.

FIG. 6 illustrates the manner in which an expansion tank 47 may be mounted at the rear side of a heating unit including a large boiler 45 and a burner 46. The tank 47 is assumed to be identical with the tank 7 of FIGS. 2 and 3, i.e., its plenum chamber comprises two flat rectangular housings which are connected to each other by a strap 47a. The rear wall 45a of the boiler 45 carries two supporting brackets 48, 48 which serve as a means for attaching the tank 47 to the boiler. The lower bracket 48 forms a platform and the upper bracket 49 engages one flange of the strap 47a.

A casing 50 forms with the boiler 45a compartment 50a which accommodates the expansion tank 47. This casing 50 serves as a protective shield for the expansion tank, for example, to prevent entry of dust or moisture. It will be seen that the size of the tank 47 approximates the size of the rear wall 45a and that the tank occupies very little room because its housings are flat and are placed into immediate proximity of the rear wall 45a. Furthermore, such arrangement insures that the expansion chamber of the tank 47 may be connected with the water-filled unit by resorting to a short conduit.

Referring now to FIGS. 7 and 8, there is shown another heating system whose heating unit includes a gas burner 55 having a hood 56 which serves as a means for permitting escape of combustion products. The heating system also comprises an expansion tank 52 which is identical with or analogous to the tank 28 of FIGS. 4 and 5. The shell 53 of the expansion chamber is adjacent to the hood 56. The burner 55 and tank 52 are accommodated in two adjoining compartments of a casing 57 comprising a front panel 57a, a rear panel 61 and a partitioning panel 60 which latter extends between the flat rectangular housing of the plenum chamber and the rear side of the burner 55. The hose 54 of the tank 52 extends through the partition 60. The front panel 57a is provided with an aerating slot 58 and with holes for the stems of control elements 59 which must be manipulated to regulate the flow of gaseous fuel and water.

A very important advantage of the structure shown in FIGS. 7 and 8 is that a prefabricated burner 55 may be readily assembled with the improved expansion tank 52 to form therewith a compact unit which occupies little room and carries all such control elements which are necessary to regulate the flow of fuel and water. In many instances, gas burners of the type similar to the burner 55 of FIGS. 7 and 8 are concealed in casings which resemble pieces of furniture so that they can be installed in apartments without adversely affecting the appearance of neatly furnished rooms. Such casings must be made as compact as possible. The placing of the flat rectangular housing of the expansion tank 52 behind the rear side of the burner 55 and the placing of the shell 53 adjacent to the hood 56 results in substantial savings in space while insuring that the tank 52 can invariably accommodate all surplus water in response to well. The structure shown in FIGS. 7 and 8 may be installed in a kitchen, and the heater 55 may be used to heat water for use in the kitchen. Heretofore known gas heaters for use in kitchens invariably resemble elongated cylinders and take up much more room than the casing 57.

Referring finally to FIGS. 9 and 10, there is shown a hot-water heating system which is similar to the one shown in FIGS. 7 and 8. The expansion tank 65 is similar to or identical with the tank 7 of FIGS. 2 and 3 and is installed adjacent to the rear side of a gas heater 73 having a hood 77. In this embodiment of our invention, the tank 65 actually carries the heater 73 and is directly secured to a masonry wall 66. Supporting members 67, 68 are anchored in the wall 66 and engage the flanges of the tank 65 so that one outer shell of this tank bears against suitable distancing elements 69. The means for connecting the other outer shell of the tank 65 with the rear wall of the heater 73 comprises two or more bolts 74, 75 or other suitable fasteners. The heater 73 is surrounded by a casing 70 whose rear side is open and which is hooked on to the flanges of the tank 65. The nipple which admits water into the expansion chamber of the tank 65 is shown at 76. The front panel of the casing 70 is formed with a screened aerating slot 71 and with holes for control elements 72 which regulate the flow of water and fuel.

It is clear that the improved heating system is susceptible of many additional modification without departing from the spirit of our invention. For example, the casings shown in FIGS. 6 to 10 may be replaced by non-prismatic casings. Also, the flat housings of the various expansion tanks need not be of rectangular shape.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a system of the character described, particularly in a closed water heating system, in combination, a fluid-containing unit; a heating unit for heating the fluid in said first named unit whereby such fluid expands; and an expansion tank comprising a chamber means including deformable wall means dividing said chamber means into an expansion chamber communicating with said fluid containing unit and gas chamber means composed of a first gas chamber, a second gas chamber, and passage means between said gas chambers, being small enough to prevent said deformable wall means from protruding from said first gas chamber into said second gas chamber.

2. A structure as set forth in claim 1, wherein said second gas chamber is formed by at least one housing including two opposite main walls spaced from each other a maximum distance which is only a fraction of the length and width of each of said main walls.

3. A structure as set forth in claim 1, wherein said two main walls form part of two abutting profiled shells forming together a gas filled rim and at least one hollow rib located within the confines of and having end portions communicating with said rim.

4. A structure as set forth in claim 2, wherein said expansion tank comprises a second housing having two shells separated by said deformable wall means, one of said shells being connected with said fluid containing unit and constituting said expansion chamber and the other shell being connected to and constituting with said housing said plenum chamber.

5. A structure as set forth in claim 2, wherein said second gas chamber comprises two of said housings filled with gas and communicating with each other, said expansion chamber and said first gas chamber being located between said housings.

6. A structure as set forth in claim 5, wherein said wall means comprises a diaphragm having a marginal portion sealingly clamped between said housings and said expansion chamber comprises a shell adjacent to one side of said diaphragm and forming part of the respective housing.

7. A structure as set forth in claim 5, wherein each of said housings comprises a pair of abutting shells.

8. A structure as set forth in claim 7, wherein the shells of each of said housings together form a hollow gas-filled rim and at least one hollow rib located within the confines of and having end portions communicatively connected with the respective rim.

9. A structure as set forth in claim 7, wherein said deformable wall means comprises a marginal portion and wherein one shell of each of said housings is in sealing engagement with said marginal portion.

10. A structure as set forth in claim 9, wherein said one shell of each of said housings comprises a corrugated portion which engages said marginal portion.

11. A structure as set forth in claim 1, wherein the volume of said chamber means is substantially equal to the volume of fluid which is expelled from said first-named unit in response to maximum expansion of the fluid therein.

12. A structure as set forth in claim 1, wherein said expansion tank is located adjacent one side of said heating unit and wherein the maximum dimensions of said expansion tank are such that they are within the corresponding dimensions of said heating unit.

13. A structure as set forth in claim 12 and including a casing surrounding said heating unit and at least part of said expansion tank.

14. A structure as set forth in claim 12, wherein said expansion tank forms one wall of said casing.

15. A structure as set forth in claim 12, wherein said heating unit is a gas heater having an outlet for combustion products and wherein said chamber means is arranged laterally and adjacent said outlet.

References Cited
UNITED STATES PATENTS

| | | | |
|---|---|---|---|
| 2,695,753 | 11/1954 | Kirk | 237—8 |
| 2,790,606 | 4/1957 | Morgan et al. | 237—63 |
| 3,080,119 | 3/1963 | Shutkufski | 237—63 |

EDWARD J. MICHAEL, *Primary Examiner.*